(12) United States Patent
Wang et al.

(10) Patent No.: US 6,481,901 B1
(45) Date of Patent: Nov. 19, 2002

(54) ASYMMETRICAL SLEEVE FOR FIBER OPTICAL COLLIMATORS AND METHOD THEREFOR

(75) Inventors: Li Wang, San Jose, CA (US); Timothy Yuen-Lian Wang, San Jose, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 0 days.

(21) Appl. No.: 09/922,323

(22) Filed: Aug. 2, 2001

(51) Int. Cl.[7] ................................................ G02B 6/36
(52) U.S. Cl. ........................................................ 385/79
(58) Field of Search ............................. 385/79, 31, 32, 385/84, 147

(56) References Cited

U.S. PATENT DOCUMENTS

| | | | | |
|---|---|---|---|---|
| 3,846,010 A | * | 11/1974 | Love et al. ................... | 385/54 |
| 5,692,081 A | * | 11/1997 | Takahashi .................... | 385/60 |
| 5,809,193 A | * | 9/1998 | Takahashi .................... | 385/61 |
| 6,168,319 B1 | * | 1/2001 | Francis ........................ | 385/55 |
| 6,173,097 B1 | * | 1/2001 | Throckmorton et al. ...... | 385/56 |

FOREIGN PATENT DOCUMENTS

JP      2-151818    *   6/1990

\* cited by examiner

*Primary Examiner*—Tulsidas Patel
(74) *Attorney, Agent, or Firm*—Joe Zheng; C. P. Chang

(57) ABSTRACT

Improved designs of fiber collimators that include an asymmetric sleeve are disclosed. According to one embodiment of the present invention, the asymmetric sleeve is so shaped that, when arranged next to each other, two collimators with the asymmetric sleeve achieves a lateral distance shorter than the outer diameter of the collimators, which makes it possible to design smaller optical components without effecting the performance and characteristics thereof.

10 Claims, 4 Drawing Sheets

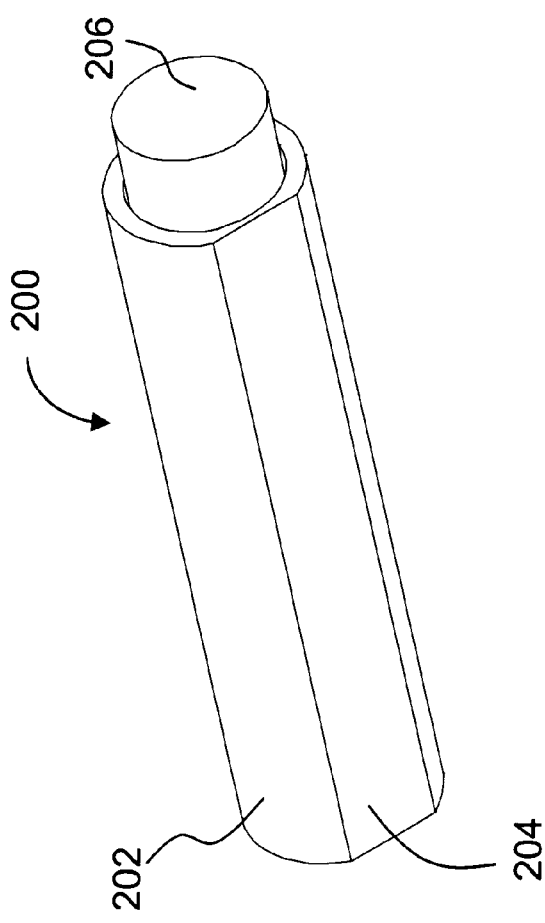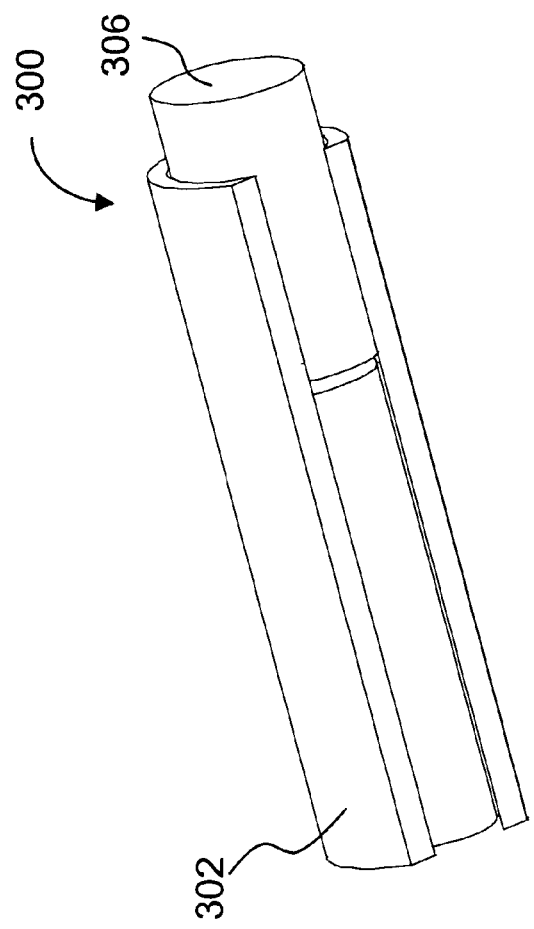

US 6,481,901 B1

ASYMMETRICAL SLEEVE FOR FIBER OPTICAL COLLIMATORS AND METHOD THEREFOR

BACKGROUND OF THE INVENTION

1. Technical Field

The invention relates to fiber optical collimators. More particularly, the invention relates to an asymmetric sleeve for the fiber optical collimators and methods for making the asymmetric sleeve.

2. Description of the Prior Art

In most of modern fiber optical components, collimators are often used to collimate light leaving fibers and focus collimated light to fibers or devices. There is a strong need to reduce the sizes of all fiber optical components since smaller sizes can reduce the overall cost and weight of a fiber optical system and can thus increase its portability and reliability. The collimator size often becomes an important issue, even a limiting factor in many cases, for the overall size of a resultant component. For example, for three-port fiber optical circulators, if three collimators need to be used, i.e., each collimator for each port, the lateral dimension thereof is often limited by the space occupied by the side of port 1 and port 3 collimators. In addition to the space issue, the crystals used in such circulators must be big enough to accommodate the big light beam separation created by the port 1 and port 3 collimators separation.

One type of three-port circulators was proposed to include only two collimators so as to reduce the circulator size and associated crystal cost. But those circulators with only two collimators are difficult to align as a result of the more complicated optical paths that are needed to use a single collimator for two ports. Therefore, it is highly desirable to use three collimators and simple traditional circulator optical configurations, and at the same time, still have small physical sizes.

FIG. 1A shows a commonly used collimator 100 comprising a ferrule 102, a rod lens 104 and a cylindrical sleeve, wherein a fiber 108 is encapsulated in the ferrule 102. A perspective view of the collimator 100 is shown in FIG. 1B. The minimum achievable size of a collimator is determined by the outer diameter of the cylindrical sleeve for a given size of the rod lens and ferrule.

In the type of the circulator that includes three collimators as described above, one will have to arrange two collimators next to each other. However, the center to center distance L of the two adjacent collimators cannot be less than D, the outer diameter of the cylindrical sleeve as shown in the FIG. 1C. In real applications, it will be desirable to have such two collimators arranged next to each other while the center to center distance L is less than D.

SUMMARY OF THE INVENTION

The present invention, generally speaking, provides a new design of fiber collimators that include an asymmetric sleeve. According to one embodiment of the present invention, the asymmetric sleeve is so shaped that, when arranged next to each other, two collimators with the asymmetric sleeve achieves a lateral distance shorter than the outer diameter of the collimators. One of the advantages or benefits is that the reshaped sleeve of a collimator can make it possible to design smaller optical components without effecting the performance and characteristics thereof. As a result, the sizes of the materials or components such as crystals in circulators and prisms in opto-mechanical switches can be reduced.

One of the objects of the present invention is to provide a new design of optical collimators that, when used in multiple, can be arranged in a reduced dimension.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 2 shows an improved design of a collimator according to one embodiment of the present invention;

FIG. 3 shows another improved design of a collimator according to one embodiment of the present invention.

DETAILED DESCRIPTION OF THE INVENTION

Figure 1A:
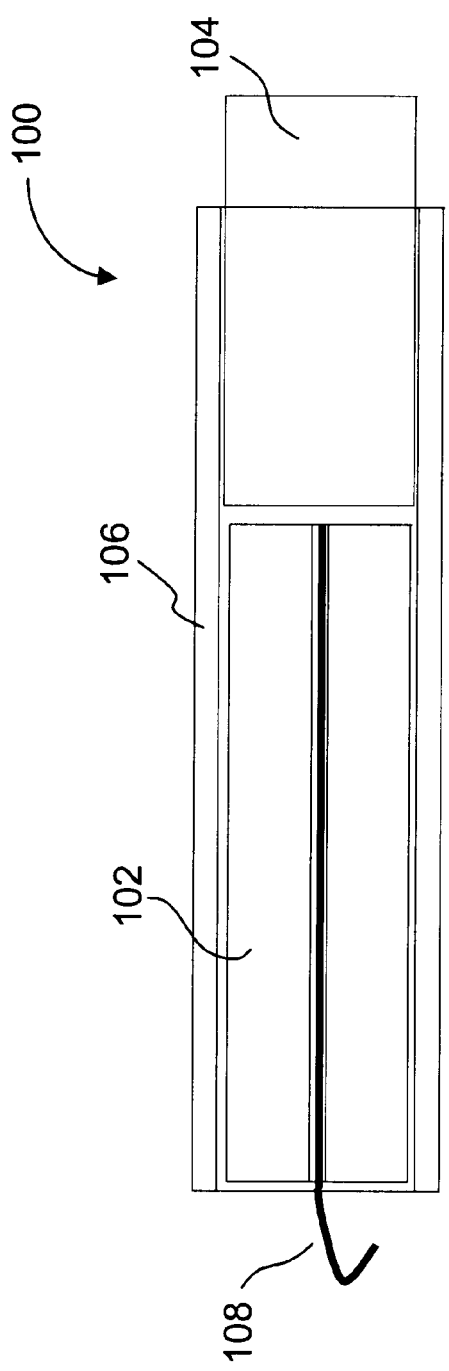
FIG. 1A shows a commonly used collimator comprising a ferrule, a rod lens and a cylindrical sleeve, wherein a fiber is encapsulated in the ferrule.
Figure 1B:
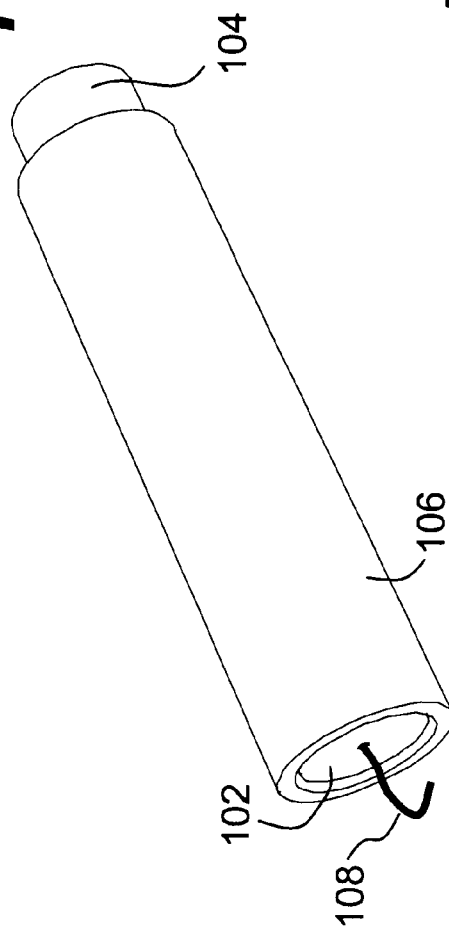
FIG. 1B shows a perspective view of the collimator of FIG. 1A.
Figure 1C:
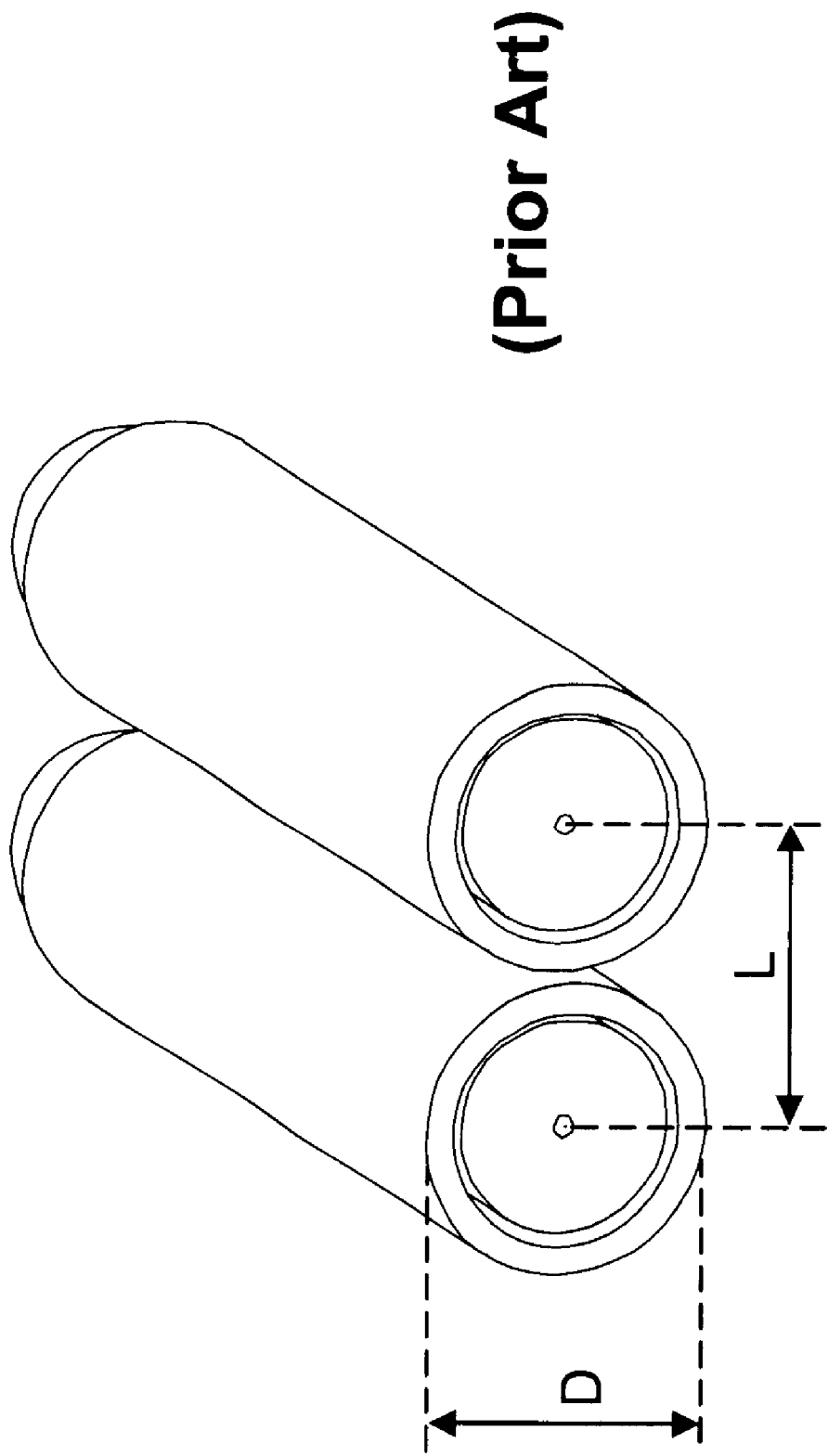
FIG. 1C shows a perspective view of two adjacent collimators with a distance L between two centers thereof, each of the two collimators has an outer diameter D.

The present invention pertains to improved designs of fiber collimators so that the fiber collimators, when arranged next to each other, maintains a lateral distance shorter than the outer diameter of the collimators. The lateral distance L is defined between the centers of the cross-section of two cylinders respectively housing the collimators. The outer diameter D is the diameter of the cylinders. Both the lateral distance L and the outer diameter D are illustrated as an example in FIG. 1B.

The detailed description of the present invention is presented largely in terms of procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Referring now to the drawings, in which like numerals refer to like parts throughout the several views. FIG. 2 shows an improved design of a collimator 200 according to one embodiment of the present invention. Different from the collimators in the prior art, the collimator 200 has a sleeve 202 that is made asymmetric. In other words, sleeve 202 has a chopped portion 204 so that, when two such collimators are arranged together with the chopped portions facing to each other, the lateral distance L of the two combined collimators is shorter than twice the outer diameter of the collimator. Depending on an exact implementation, the depth of the chopped portion 204 can be adjusted. If a pre-determined space 2D-2Δ is allowed to accommodate two lateral arranged collimators, the depth of the chopped portion 204 of the collimator 200 can go as much as Δ without affecting the ferrule (not shown) and the optical lens 206.

One exemplary method for achieving such collimators with an asymmetric sleeve is to remove mechanically the chopped portion from a collimator with a symmetric or cylindrical sleeve. The chopped portion can be removed according to a pre-defined size so that two or more of such collimators can be intimately arranged next to each other in such a way that the combined size reaches a minimum without affecting the performance of each of the collimators.

FIG. 3 shows another improved design of a collimator 300 according to one embodiment of the present invention. The collimator 300 has a sleeve 302 that is opened on one side. In comparison to the collimator 200 of FIG. 2, the collimator 300 is an extreme case in which the inner surface of the sleeve 302 is opened up without further cutting down the ferrule and the optical lens. As a result, when two such collimators are arranged in such a way that the opened inner surfaces are intimately contacted, the lateral distance of the combined collimators is minimized.

Figure 4:
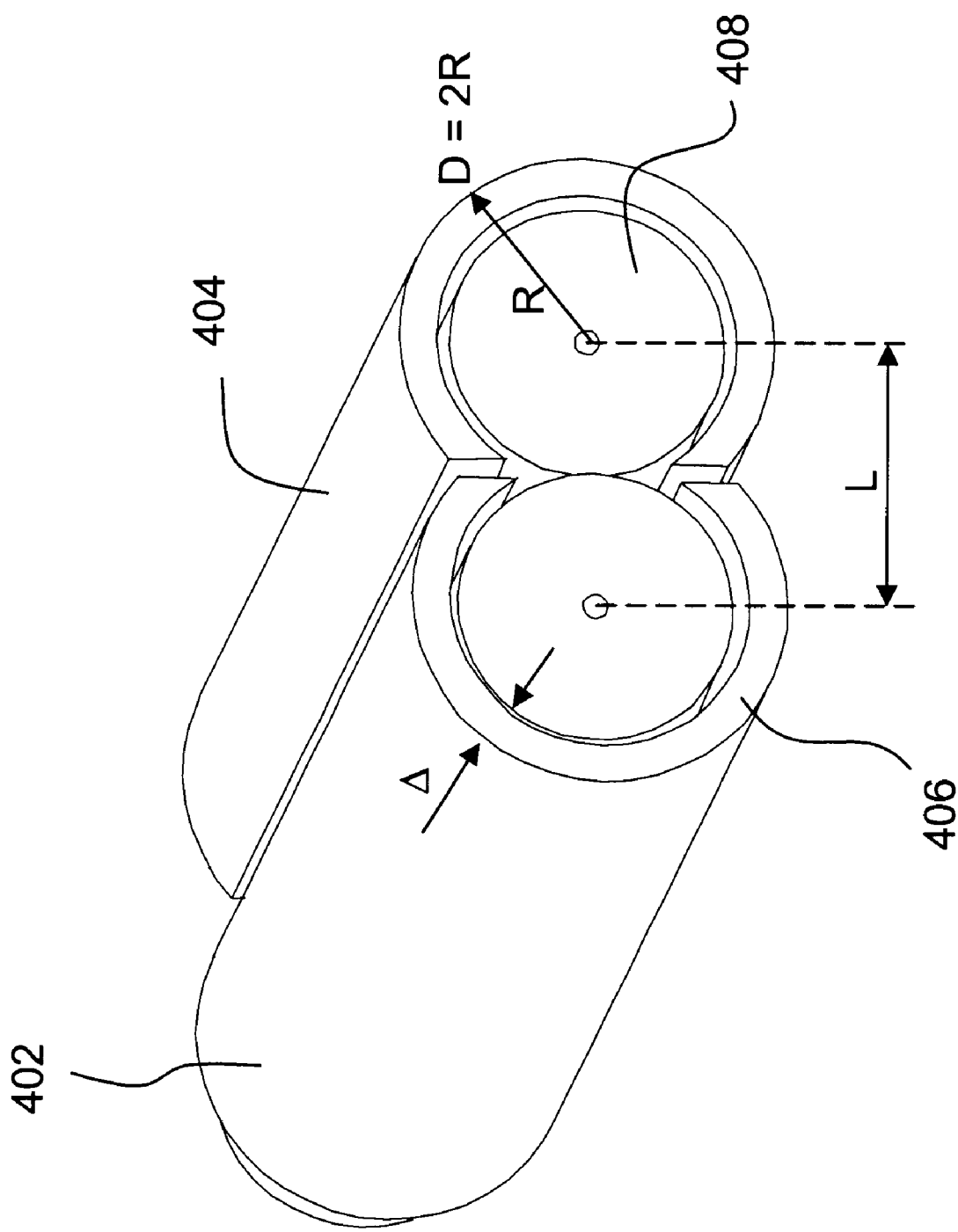
FIG. 4 illustrates two collimators being arranged next to each other, both of the collimators are designed according to the present invention.

FIG. 4 illustrates two collimators 402 and 404 being arranged next to each other. Both of the collimators 402 and 404 are designed according to the present invention. It is assumed that the size of the collimators 402 and 404 are identical. If the collimators are in different size in a very rare situation, the description herein can be readily appreciated by those skilled in the art and equally applied thereto.

A collimator (e.g. 402) includes a sleeve 406 enclosing a set of coaxially aligned ferrule and lens 408. Depending on an exact implementation, one or more fibers are disposed in the ferrule (not sown). From a cross section perspective of the collimator 402, the sleeve 406 has an outer diameter D and a circular thickness Δ (hence the inner diameter thereof is D-2Δ). Different from the prior art designs, the cross section of the sleeve 406 is of "C" type. In other words, the sleeve 406 has a portion on one side flattened or removed. Mechanically, a portion of the sleeve 406 is removed so that, when two of such collimators are arranged next to each other, the flattened sides of the collimators can be intimately contacted. As a result, the lateral distance between the centers of the collimators can be smaller than the outer diameter.

The present invention may be used in optical circulators, opto-mechanical switches, optical add/drop modules, and many other optical components and subsystems. The invention can be implemented as a method and apparatus, each yielding at least one or more of the following advantages or benefits. One of them is that the reshaped sleeve of a collimator can make it possible to design smaller optical components without effecting the performance and characteristics thereof. As a result, the sizes of the materials or components such as crystals in circulators and prisms in opto-mechanical switches can be reduced. Other advantages or benefits may be appreciated from the description herein by those skilled in the art.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. For example, a sleeve may be flattened on both sides to facilitate an arrangement of three or more collimators. Also, the asymmetrical sleeve based collimators can extend in two directions by cutting appropriate interfaces. Accordingly, the scope of the present invention is defined by the appended claims rather than the forgoing description of embodiments.

We claim:

1. A fiber collimator assembly comprising:
    at least two collimators, each of the two collimators including:
        an optical lens;
        a ferrule coaxially aligned with the optical lens;
        a sleeve encapsulating the ferrule and the optical lens, wherein the sleeve having a diameter and a flat surface extending along the sleeve on one side thereof; and
        when two collimators are arranged next to each other with flat surface of respective sleeves abutting each other and axes thereof in parallel, a distance between centers of the two collimators is less than the diameter of the sleeve.

2. The fiber collimator assembly of claim 1, wherein the flat surface of the sleeve is formed by removing a portion of the sleeve on the one side.

3. The fiber collimator assembly of claim 2, wherein the portion of the sleeve on the side is removed to an extent that the encapsulated optical lens and ferrule are not exposed.

4. The fiber collimator assembly of claim 2, wherein the portion of the sleeve on the side is removed so deep that the encapsulated optical lens and ferrule are exposed to minimize the distance between centers of the two collimators.

5. The fiber collimator assembly of claim 1, wherein a cross-section of the sleeve is of "C" type.

6. A fiber collimator assembly comprising:
    at least two collimators, each of the two collimators including:
        an optical lens;
        a ferrule including at least a fiber coaxially aligned with the optical lens;
        a sleeve having a diameter and encapsulating the ferrule and the optical lens,
        wherein the sleeve is flattened on one side extending along the sleeve; and when the two collimators are arranged with the flattened sides abutting each other, a distance between centers of the two collimators is smaller than the diameter of the sleeve.

7. A method of assembling two fiber collimators, the method comprising:
    determining a distance that is less than a lateral distance between centers of the two fibers collimators, each of the fiber collimators having a cylindrical sleeve encapsulating at least a ferrule and a lens;
    according to the distance, removing a portion of the cylindrical sleeve from each of the two fiber collimators in such a way that each of the fiber collimators has a flattened surface on one side extending along the cylindrical sleeve; and
    abutting the two fiber collimators at the flattened surface thereof.

8. The method of claim 7, wherein each fiber collimator has a diameter, a lateral distance between centers of the two fiber collimators is shorter than the diameter when the two fiber collimators are arranged with the respective flattened surface facing each other.

9. The method of claim 7, wherein the sleeve has an inner surface and an outer surface, and wherein the removing of the portion comprises cutting off a flat portion from the outer surface of the sleeve towards the inner surface without exposing the encapsulated ferrule and lens.

10. The method of claim 7, wherein the sleeve has an inner surface and an outer surface, and wherein the removing of the portion comprises cutting off a flat portion from the outer surface of the sleeve towards the inner surface and exposing the encapsulated ferrule and lens till two such fiber collimators can be fit into the distance.

\* \* \* \* \*